(12) United States Patent
Cvelbar et al.

(10) Patent No.: US 11,293,328 B2
(45) Date of Patent: Apr. 5, 2022

(54) MIXER BAFFLE WITH INTEGRATED SENSOR

(71) Applicant: Faurecia Emissions Control Technologies, USA, LLC, Columbus, IN (US)

(72) Inventors: Randall Cvelbar, Columbus, IN (US); Eduardo Alano, Columbus, IN (US); Amee Bhatt, Columbus, IN (US); Amaresh Rakkasagi, Bengaluru (IN); Anthony Burnett, Freetown, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/902,397

(22) Filed: Jun. 16, 2020

(65) Prior Publication Data

US 2021/0388751 A1     Dec. 16, 2021

(51) Int. Cl.
| | | |
|---|---|---|
| *F01N 3/00* | (2006.01) | |
| *F01N 13/00* | (2010.01) | |
| *F01N 3/20* | (2006.01) | |
| *F01N 3/28* | (2006.01) | |

(52) U.S. Cl.
CPC ......... *F01N 13/008* (2013.01); *F01N 3/2066* (2013.01); *F01N 3/2892* (2013.01); *F01N 2240/20* (2013.01); *F01N 2560/026* (2013.01); *F01N 2560/06* (2013.01); *F01N 2610/08* (2013.01); *F01N 2610/1453* (2013.01)

(58) Field of Classification Search
CPC .... F01N 3/2892; F01N 2240/20; F01N 3/008; F01N 2560/026; F01N 2560/06; F01N 2610/14
See application file for complete search history.

(56) References Cited

U.S. PATENT DOCUMENTS

| | | | |
|---|---|---|---|
| 2003/0226412 A1 | 12/2003 | Rumminger et al. | |
| 2012/0216513 A1* | 8/2012 | Greber | F01N 3/2066 60/295 |
| 2014/0318112 A1* | 10/2014 | Solbrig | F01N 13/08 60/324 |
| 2015/0078976 A1* | 3/2015 | Bui | B01F 5/0057 423/212 |

(Continued)

FOREIGN PATENT DOCUMENTS

| | | |
|---|---|---|
| DE | 102014217844 A1 | 3/2016 |
| DE | 102015110319 A1 | 10/2016 |
| WO | 2019139560 A1 | 7/2019 |

OTHER PUBLICATIONS

U.S. Appl. No. 16/834,182, filed Mar. 30, 2020.

*Primary Examiner* — Matthew T Largi
(74) *Attorney, Agent, or Firm* — Carlson, Gaskey & Olds, P.C.

(57) ABSTRACT

A mixer for a vehicle exhaust system, according to an exemplary aspect of the present disclosure includes, among other things, a mixer outer shell defining an internal cavity configured to receive engine exhaust gases, the mixer outer shell having a first end and a second end opposite the first end. A baffle is associated with one of the first and second ends. The baffle comprises a body that includes at least one sensor area formed within the body.

22 Claims, 2 Drawing Sheets

(56) References Cited

U.S. PATENT DOCUMENTS

| | | | |
|---|---|---|---|
| 2015/0240689 A1* | 8/2015 | Guilbaud | F01N 13/10 60/295 |
| 2015/0273411 A1* | 10/2015 | Chapman | B01F 3/04049 60/301 |
| 2015/0328585 A1* | 11/2015 | Asaura | F01N 3/208 422/111 |
| 2016/0138454 A1* | 5/2016 | Alano | B01F 5/0614 422/168 |
| 2016/0245142 A1 | 8/2016 | Venkataraghavan et al. | |
| 2016/0251990 A1* | 9/2016 | Dimpelfeld | F01N 3/2892 60/324 |
| 2016/0363027 A1 | 12/2016 | Lorenz et al. | |
| 2019/0101041 A1* | 4/2019 | Willats | F01N 13/1805 |

* cited by examiner

MIXER BAFFLE WITH INTEGRATED SENSOR

TECHNICAL FIELD

This disclosure relates generally to a mixer for a vehicle exhaust system, and more particularly to a mixer baffle including at least one integrated sensor.

BACKGROUND

Vehicles include an exhaust system that has catalyst components to reduce emissions. The exhaust system includes an injection system with an injector or doser that injects a diesel exhaust fluid (DEF), or a reducing agent such as a solution of urea and water for example, upstream of a selective catalytic reduction (SCR) catalyst which is used to reduce NOx emissions. A mixer is positioned upstream of the SCR catalyst and mixes engine exhaust gases and products of urea transformation. One or more sensors are often utilized to determine characteristics of the exhaust gas flowing through the mixer. Mixers can have different sizes dependent upon application and available packaging space. Incorporating sensors into the system often requires increasing a size of the mixer, which is disadvantageous from a packaging aspect.

SUMMARY

A mixer for a vehicle exhaust system, according to an exemplary aspect of the present disclosure includes, among other things, a mixer outer shell defining an internal cavity configured to receive engine exhaust gases, the mixer outer shell having a first end and a second end opposite the first end. A baffle is associated with one of the first and second ends. The baffle comprises a body that includes at least one sensor area formed within the body.

In a further non-limiting embodiment of the foregoing mixer, the body includes at least one opening that receives a majority of the engine exhaust gas, and wherein the at least one sensor area is spaced away from the at least one opening.

In a further non-limiting embodiment of any of the foregoing mixers, the body includes a plurality of additional openings that are smaller than the at least one opening, and wherein the at least one sensor area is spaced apart from and located between the at least one opening and the plurality of additional openings.

In a further non-limiting embodiment of any of the foregoing mixers, the at least one sensor area comprises at least two sensor areas each configured to receive at least a portion of a sensor.

In a further non-limiting embodiment of any of the foregoing mixers, the body comprises a flat plate that covers one of the first and second ends of the mixer outer shell, and wherein the at least one sensor area comprises a recessed area formed within the flat plate.

In a further non-limiting embodiment of any of the foregoing mixers, the recessed area is configured to receive at least a portion of a NOx sensor or a temperature sensor.

In a further non-limiting embodiment of any of the foregoing mixers, the mixer outer shell defines a mixer central axis, and wherein the recessed area extends from an edge of the flat plate toward the mixer central axis.

In a further non-limiting embodiment of any of the foregoing mixers, the recessed area has a length that is greater than a width, and wherein the width increases along the length in a direction toward the edge.

In a further non-limiting embodiment of any of the foregoing mixers, a maximum width of the recessed area is at the edge and a minimum width of the recessed area faces the mixer central axis.

In a further non-limiting embodiment of any of the foregoing mixers, the mixer outer shell includes a doser mount with a doser opening configured to receive a doser to spray a fluid into the internal cavity, and wherein the mixer outer shell includes at least one sensor opening that opens to the at least one sensor area.

In a further non-limiting embodiment of any of the foregoing mixers, the first end comprises an upstream end and the second end comprises a downstream end, and wherein the baffle comprises an inlet baffle mounted at the upstream end, with the doser mount area being downstream of the inlet baffle.

A vehicle exhaust system component, according to yet another exemplary aspect of the present disclosure includes, among other things, a mixer having an upstream end configured to be connected to an upstream exhaust component and a downstream end configured to be connected to a downstream component, the mixer having a mixer outer shell providing an internal cavity that surrounds a mixer central axis. The mixer outer shell has a doser opening and at least one sensor opening. An inlet baffle is mounted at the upstream end, wherein the inlet baffle comprises a flat plate body that includes at least one sensor area formed within the flat plate body, and wherein the at least one sensor area is open to the at least one sensor opening.

In a further non-limiting embodiment of any of the foregoing embodiments, the flat plate body includes at least one primary opening that receives a majority of the engine exhaust gas, and a plurality of additional openings that are smaller than the at least one primary opening, and wherein the at least one sensor area is spaced apart from and located between the at least one primary opening and the plurality of additional openings.

In a further non-limiting embodiment of any of the foregoing embodiments, the at least one sensor area comprises a pocket or recessed area formed within the flat plate body.

In a further non-limiting embodiment of any of the foregoing embodiments, the at least one sensor area comprises at least two sensor areas each configured to receive at least a portion of a sensor that comprises a NOx sensor or a temperature sensor.

In a further non-limiting embodiment of any of the foregoing embodiments, the pocket or recessed area extends from an edge of the flat plate body toward the mixer central axis.

In a further non-limiting embodiment of any of the foregoing embodiments, the pocket or recessed area has a length that is greater than a width, and wherein the width increases along the length in a direction toward the edge.

A method, according to an exemplary aspect of the present disclosure includes, among other things, forming a mixer baffle as a plate body including an integrally formed sensor area configured to receive at least a portion of a sensor; and mounting the mixer baffle to a mixer outer shell having an upstream end configured to be connected to an upstream exhaust component and a downstream end configured to be connected to a downstream component, the mixer outer she providing an internal cavity that surrounds a mixer central axis.

In a further non-limiting embodiment of the foregoing method, the mixer baffle comprises an inlet baffle, and including providing the mixer outer shell with a doser opening and at least one sensor opening, mounting the inlet baffle at the upstream end of the mixer outer shell, aligning a doser mount configured to receive a doser with the doser opening, and aligning the at least one sensor opening with the at least one sensor area.

In a further non-limiting embodiment of the foregoing method, the plate body comprises a flat plate, and including forming the at least one sensor area as a pocket or recessed area within the flat plate, wherein the pocket or recessed area extends from an edge of the flat plate toward the mixer center central axis.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary mixer that provides an integrated sensor feature that allows mixer length to be increased.

Figure 1:
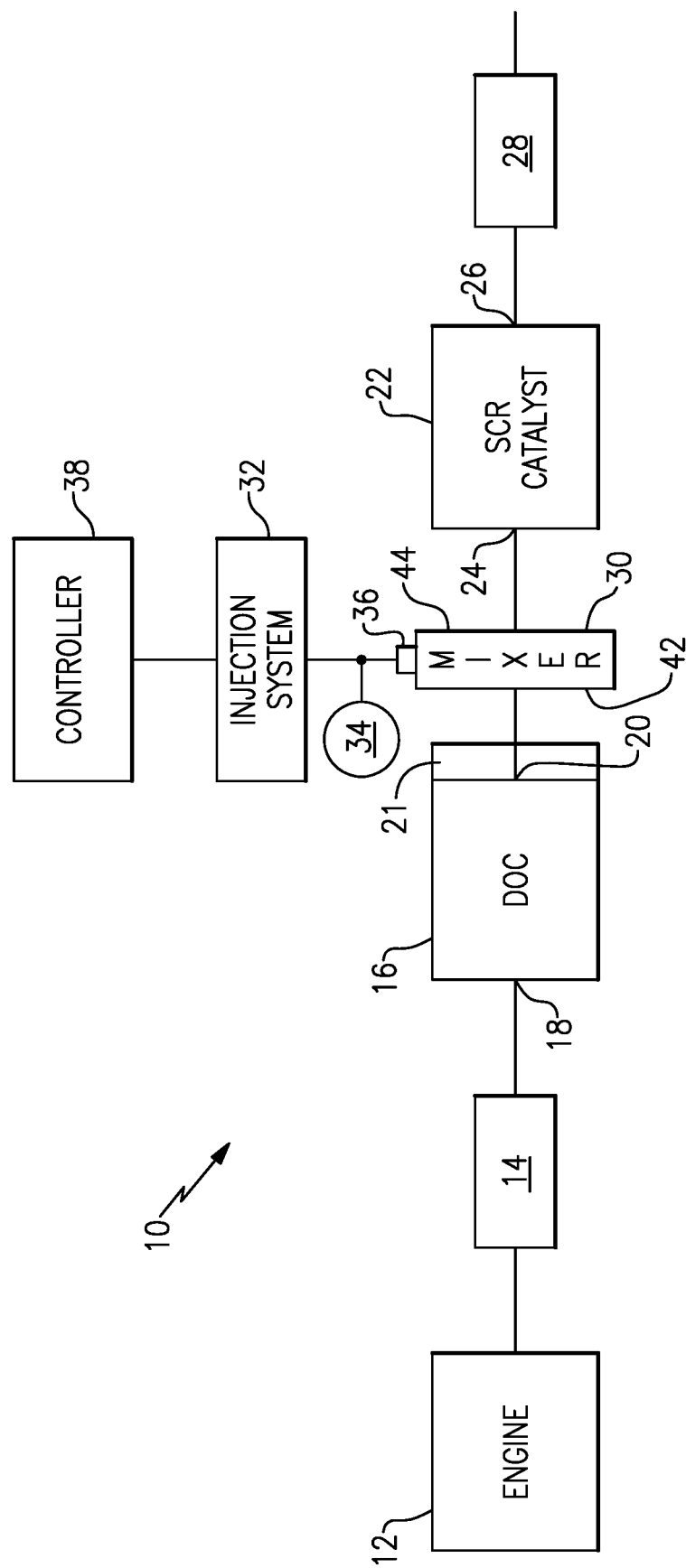
FIG. 1 schematically illustrates one example of a vehicle exhaust system with a mixer according to an exemplary disclosure.

FIG. 1 shows a vehicle exhaust system 10 that conducts hot exhaust gases generated by an engine 12 through various upstream exhaust components 14 to reduce emission and control noise as known. In one example configuration, the upstream exhaust component 14 comprises at least one pipe that directs engine exhaust gases into a diesel oxidation catalyst (DOC) 16 having an inlet 18 and an outlet 20. Downstream of the DOC 16 there may be a diesel particulate filter (DPF) 21 that is used to remove contaminants from the exhaust gas as known. Downstream of the DOC 16 and optional DPF 21 is a selective catalytic reduction (SCR) catalyst 22 having an inlet 24 and an outlet 26. The outlet 26 communicates exhaust gases to downstream exhaust components 28, which eventually exhaust to atmosphere. Optionally, component 22 can comprise a catalyst that is configured to perform a selective catalytic reduction function and a particulate filter function. The various downstream exhaust components 28 can include one or more of the following: pipes, valves, catalysts, mufflers, tailpipes etc. These upstream 14 and downstream 28 components can be mounted in various different configurations and combinations dependent upon vehicle application and available packaging space.

In one example, a mixer 30 is positioned downstream from the outlet 20 of the DOC 16 or DPF 21 and upstream of the inlet 24 of the SCR catalyst 22. The upstream catalyst and downstream catalyst can be in-line or in parallel. The mixer 30 is used to generate a swirling or rotary motion of the exhaust gas.

An injection system 32 is used to inject a reducing agent, such as a solution of urea and water for example, into the exhaust gas stream upstream from the SCR catalyst 22 such that the mixer 30 can mix the urea and exhaust gas thoroughly together via a swirling generated flow. The injection system 32 includes a fluid supply 34, a doser 36, and a controller 38 that controls injection of the urea as known.

Figure 2:
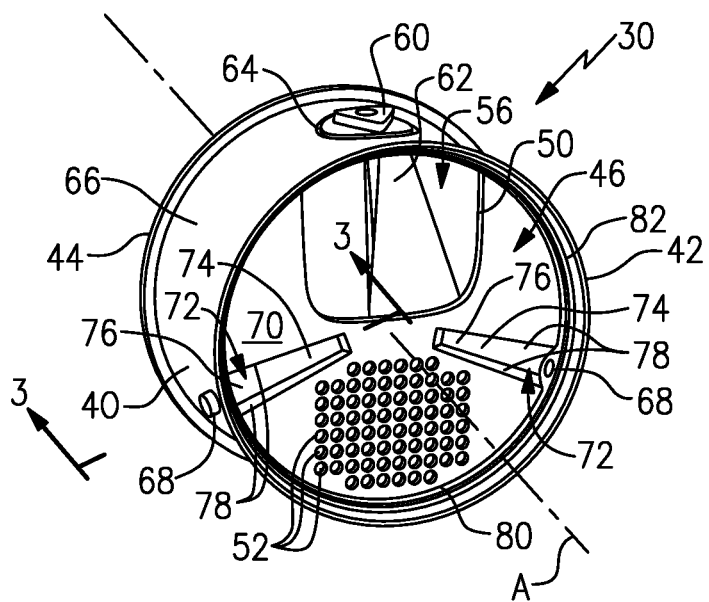
FIG. 2 is an inlet end view of one example of a mixer with a baffle having a sensor area as used in the vehicle exhaust system of FIG. 1.

The mixer 30 has an inlet end 42 configured to receive the engine exhaust gases and an outlet end 44 to direct a mixture of swirling engine exhaust gas and products transformed from urea to the SCR catalyst 22. FIG. 2 shows one example of a mixer 30 that includes an inlet baffle 46 at the inlet end 42. An outlet baffle is associated with the outlet end 44 but is not visible in the view of FIG. 2. The inlet baffle 46 comprises a generally flat plate configuration. In one example, the inlet baffle 46 includes at least one large inlet opening 50 that receives the majority of the exhaust gas. The inlet baffle 46 also includes a plurality of perforations, slots, or additional inlet openings 52 that ensure optimal homogenization of exhaust gases and reduce back pressure.

The inlet baffle 46 is fixed to a mixer outer housing or shell 40 that defines a mixer central axis A and provides an internal mixing chamber or internal cavity 56 between the inlet baffle 46 and outlet baffle, Exhaust gas and injected fluid spray, which is injected via the doser 36, are mixed within the internal cavity 56. In one example shown in FIG. 2, a doser mount 60 is used to mount the doser 36 relative to the mixer outer shell 40. An inlet reactor with a swirl cone or chamber 62 is positioned within the internal cavity 56 at a location adjacent to the doser mount 60, The doser mount 60 is mounted to the mixer outer shell 40 at a doser opening 64 formed within the mixer outer shell 40. The doser mount 60 is configured to support the doser 36 that injects a fluid into the internal cavity 56 of the mixer outer shell 40 by way of the swirl chamber 62.

The upstream end 42 of the mixer outer shell 40 is configured to be connected to an upstream exhaust component, such as the DOC 16 and/or OFF 21, and the downstream end 44 of the mixer outer shell 40 is configured to be connected to a downstream component, such as the SCR 22 for example. As shown in FIG. 2, the mixer outer shell 40 has an outer peripheral surface 66 that surrounds the internal cavity 56 and mixer central axis A. The doser opening 64 is formed within the outer peripheral surface 66. One or more sensor openings 68 are also formed within the outer peripheral surface 66. In the example shown in FIG. 2, there are two sensor openings 68 formed within the outer peripheral surface 66. The sensor openings 68 are configured to receive exhaust gas sensors that are used to determine characteristics of the exhaust gas flowing through the mixer 30. This will be discussed in greater detail below.

The inlet baffle 46 is mounted at the upstream end 42 of the mixer outer shell 40 and comprises a flat plate body 70 that includes at least one sensor area 72 formed directly within the flat plate body 70. In the example shown, there are two sensor areas 72 formed within the flat plate body 70, and each sensor area 72 is open to one of the sensor openings 68. The mixing space is defined between the outlet 20 of the DOC 16 or the outlet from the DPF 21 and the inlet 24 of the SCR 22. The mixing length is between the doser 36 and the inlet 24 of the SCR 22. The flat inlet baffle 46 with integrated packaging areas 72 for sensors allows the mixer to be located as close as possible to the outlet 20 in order to increase mixing length. In one example, the inlet baffle 46 comprises a stamped metal sheet that forms the baffle as a generally flat plate as opposed to a helical shaped baffle. The flat plate baffle 46 extends across the entire upstream end 42 of the mixer 30 to enclose the upstream end of the internal cavity 56. The outlet baffle (not shown) extends across the entire downstream end 44 of the mixer 30 to enclose the downstream end 44 of the internal cavity 56.

In one example, the flat plate body 70 includes the inlet/primary opening 50 that receives the majority of the exhaust gas to be directed into the internal cavity 56. The flat plate body 70 also includes the plurality of additional openings 52 that ensure optimal homogenization of exhaust gases and reduce back pressure. The plurality of additional openings 52 are smaller than the primary opening 50. The additional openings 52 can be formed to have any shape and/or size, and can be formed in different patterns/locations within the body 70. In one example, the sensor areas 72 are spaced apart from both the primary opening 50 and additional openings 52 such that they do not intersect or overlap each other. In one example, the sensor areas 72 are located between the primary opening 50 and the plurality of additional openings 52. In one example, one sensor area 72 is positioned on one side of the primary opening 50 and the other sensor area 72 is positioned on an opposite side of the primary opening, and the additional openings 52 are positioned between the two sensor areas 72. The sensor areas 72 can also be formed at different locations as needed to accommodate different baffle plate configurations.

Figure 3:
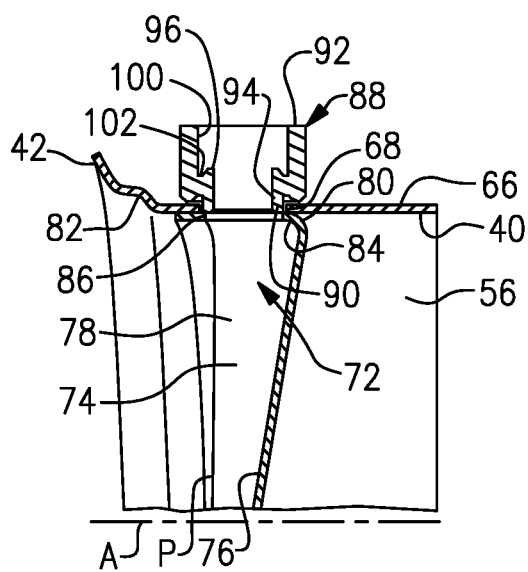
FIG. 3 is an enlarged section view of the sensor area in the baffle of FIG. 2.

In one disclosed configuration, each sensor area 72 comprises a pocket or recessed area 74 formed within the flat plate body 70. The flat plate body 70 comprises a planar surface P and the pocket or recessed area 74 comprises a deformed, stamped, or indented portion that extends outward of the planar surface P in a direction along the mixer central axis A as shown in FIG. 3. The pocket or recessed area 74 includes a base surface 76 with opposing side walls 78 extending from the base surface 76 to the planar surface P of the flat plate body 70.

In one example, the pocket or recessed areas 74 extend outwardly from the flat plate body 70 in the downstream direction. The pocket or recessed areas 74 are formed at select locations that allow sensors to be integrated into the inlet baffle packaging space. In this configuration, the pocket or recessed areas 74 can also serve as strengthening ribs. This improves the durability and overall strength of the inlet baffle 46.

The inlet baffle 46 includes an outer peripheral edge or rim/lip 80 that fits against an inner surface 82 of the mixer outer shell 40. In one example, the lip 80 extends away from the flat plate body 70 in a direction along the mixer central axis A. At each pocket or recessed area 74, the rim/lip 80 comprises an end wall portion 84 that includes a baffle sensor opening 86 that is aligned with the sensor opening 68 formed in the mixer outer shell 40.

In one example, the pocket or recessed area 74 extends from the outer peripheral edge or rim/lip 80 of the flat plate body 70 toward the mixer central central axis A. The pocket or recessed area 74 has a length that is greater than a width. In one example, the width increases along the length in a direction toward the rim/lip 80. In one example, a maximum width of the recessed area 74 is at the edge 80 and a minimum width of the recessed area 74 faces the mixer central axis A. Other shapes and/or sizes of the recessed area 74 could also be used depending on inlet baffle packaging space.

Figure 4:
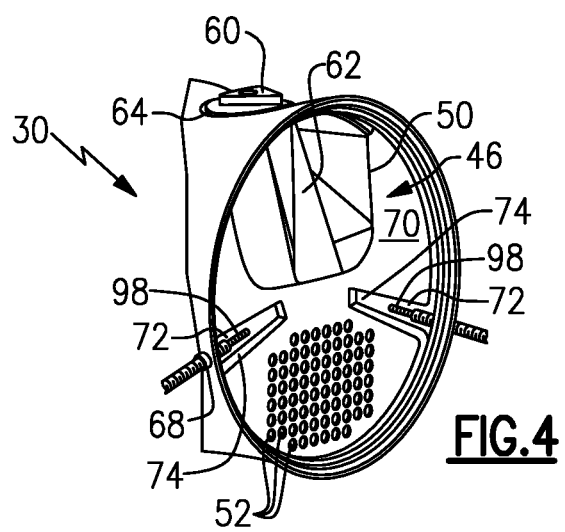
FIG. 4 is a view similar to FIG. 2 and which includes sensors in the sensor areas.

As shown in FIG. 3, a sensor mounting boss 88 is fixed to the outer peripheral surface 66 of the mixer outer shell 40 at the sensor opening 68. In one example, the sensor mounting boss 88 comprises a cylindrical body extending between first 90 and second 92 ends. The first end 90 has a reduced diameter or neck portion 94 that has one end that fits at least partially within the sensor opening 68. An opposite end of the neck portion 94 extends into the open center of the cylindrical body to form a ledge or seat 96 for a sensor 98 (FIG. 4). The second end 92 has a larger diameter than the neck portion 94 at the first end 90. An inner surface 100 of the cylindrical body transitions to the seat 96 via a radial wall 102 such that there is a gap between the seat 96 and the inner surface 100.

FIG. 4 shows an example where sensors 98 are positioned at the sensor areas 72. Each sensor area 72 is configured to receive at least a portion of the sensor 98. In one example, the sensors 98 can comprise a NOx sensor, a temperature sensor, or any other exhaust gas sensor. The sensors 98 are installed within the sensor mounting bosses 88 such that a tip of the sensor extends through the mixer outer shell 40 and into the pocket or recessed area 74. The sensors 98 are configured to communicate data to the controller 38 as known. The sensors 98 cannot be located within the mixing chamber; however, by integrating the sensor packaging into the flat inlet baffle 46, the mixer can be located as close as possible to the outlet of the DOC and/or DPF in order to increase the overall mixing length.

The subject disclosure provides for an inlet baffle 46 comprising a stamped sheet metal part that directs exhaust gas flow into an inlet reactor/swirl chamber 62 as well as allowing a portion of the exhaust gas flow to bypass the inlet reactor. The inlet baffle 46 comprises a flat plate body that includes integrally formed recessed areas or pockets at select locations that allow the sensors 98 to be integrated into the inlet baffle packaging space. The stamped sensor pockets 74 have the added advantage of adding strength to the inlet baffle 46 which improves the durability of the inlet baffle 46. Generally, compact mixers with flat inlet baffles require additional space for the sensors. The integration of the sensors into the inlet baffle packaging space allows for a shorter overall mixer length then would have been possible if the sensors were located upstream of the baffle.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A mixer for a vehicle exhaust system comprising:
    a mixer outer shell defining an internal cavity configured to receive engine exhaust gases, the mixer outer shell having an upstream end and a downstream end opposite the upstream end, and wherein the mixer outer shell defines a mixer central axis; and
    a baffle associated with one of the upstream and downstream ends, wherein the baffle comprises a plate body that faces an upstream or a downstream direction and that includes at least one sensor area formed within the plate body to face the upstream or the downstream direction, and wherein the plate body comprises a substantially flat plate portion having a substantially planar surface that faces the upstream or the downstream direction, and wherein the at least one sensor area comprises a recessed area that is formed within the substantially planar surface.

2. The mixer according to claim 1, wherein the plate body includes at least one opening that receives a majority of the engine exhaust gas, and wherein the at least one sensor area is circumferentially spaced away from the at least one opening about the mixer central axis.

3. The mixer according to claim 2, wherein the plate body includes a plurality of additional openings that are smaller than the at least one opening, and wherein the at least one sensor area is spaced apart from and located in the plate body circumferentially between the at least one opening and the plurality of additional openings.

4. The mixer according to claim 2, wherein the at least one sensor area comprises at least two sensor areas each configured to receive at least a portion of a sensor.

5. The mixer according to claim 1, wherein the recessed area is configured to receive at least a portion of a NOx sensor or a temperature sensor.

6. The mixer according to claim 1, wherein the baffle includes an outer peripheral edge that extends about the plate body and forms a rim or lip that fits against an inner surface of the mixer outer shell, and wherein the recessed area extends away from the outer peripheral edge of the plate body toward the mixer central axis.

7. The mixer according to claim 1, wherein the at least one sensor area has a length that is greater than a width.

8. The mixer according to claim 1, wherein the baffle includes an outer peripheral edge that extends about the plate body and forms a rim or lip that fits against an inner surface of the mixer outer shell, and wherein the recessed area has a base surface spaced away from the substantially planar surface in a direction along the mixer central axis and includes opposing side walls spaced apart from each other to define a width of the at least one sensor area, and the opposing side walls extending from the base surface to the substantially planar surface of the plate body to define a depth of the at least one sensor area, and wherein the base surface extends from the rim or lip toward the mixer central axis to define a length of the at least one sensor area.

9. The mixer according to claim 8, wherein the depth is variable, and the length is greater than the width.

10. A mixer for a vehicle exhaust system comprising:
a mixer outer shell defining an internal cavity configured to receive engine exhaust gases, the mixer outer shell having a first end and a second end opposite the first end;
a baffle associated with one of the first and second ends, wherein the baffle comprises a body that includes at least one sensor area formed within the body;
wherein the body includes at least one opening that receives a majority of the engine exhaust gas, and wherein the at least one sensor area is spaced away from the at least one opening;
wherein the body comprises a flat plate that covers one of the first and second ends of the mixer outer shell, and wherein the at least one sensor area comprises a recessed area formed within the flat plate;
wherein the mixer outer shell defines a mixer central axis, and wherein the recessed area extends from an edge of the flat plate toward the mixer central axis; and
wherein the recessed area has a length that is greater than a width, and wherein the width increases along the length in a direction toward the edge.

11. The mixer according to claim 10, wherein a maximum width of the recessed area is at the edge and a minimum width of the recessed area faces the mixer central axis.

12. A vehicle exhaust system comprising:
a mixer having an upstream end configured to be connected to an upstream exhaust component and a downstream end configured to be connected to a downstream component, the mixer having a mixer outer shell providing an internal cavity that surrounds a mixer central axis, and wherein the mixer outer shell has a doser opening and at least one sensor opening; and
an inlet baffle mounted at the upstream end, wherein the inlet baffle comprises a flat plate body that faces an upstream direction and includes at least one sensor area formed within the flat plate body to face the upstream direction, and wherein the at least one sensor area is open to the at least one sensor opening, and wherein the at least one sensor area comprises a pocket or recessed area formed within a substantially planar surface of the flat plate body that faces the upstream direction.

13. The vehicle exhaust system according to claim 12, wherein the flat plate body includes at least one primary opening that receives a majority of engine exhaust gas, and a plurality of additional openings that are smaller than the at least one primary opening, and wherein the at least one sensor area is circumferentially spaced apart from and located circumferentially between the at least one primary opening and the plurality of additional openings.

14. The vehicle exhaust system according to claim 12, wherein the at least one sensor area comprises at least two sensor areas each configured to receive at least a portion of a sensor that comprises a NOx sensor or a temperature sensor.

15. The mixer according to claim 12, wherein the inlet baffle includes an outer peripheral edge that extends about the flat plate body and forms a rim or lip that fits against an inner surface of the mixer outer shell, and wherein the pocket or recessed area extends away from the outer peripheral edge of the flat plate body toward the mixer central axis.

16. The mixer according to claim 15, wherein the pocket or recessed area has a length that is greater than a width, and wherein the width increases along the length in a direction toward the outer peripheral edge.

17. The vehicle exhaust system according to claim 12, wherein the at least one sensor area has a length that is greater than a width.

18. The vehicle exhaust system according to claim 12, wherein the inlet baffle includes an outer peripheral edge that extends about the flat plate body and forms a rim or lip that fits against an inner surface of the mixer outer shell, and wherein the pocket or recessed area comprises a base surface that extends away from the substantially planar surface in a direction along the mixer central axis and includes opposing side walls spaced apart from each other to define a width of the at least one sensor area, and the opposing side walls extending from the base surface to the substantially planar surface of the flat plate body to define a depth of the at least one sensor area, and wherein the base surface extends from the rim or lip toward the mixer central axis to define a length of the at least one sensor area.

19. The vehicle exhaust system according to claim 18, wherein the depth is variable, and the length is greater than the width.

20. A method comprising:
forming a mixer baffle as a plate body including an integrally formed sensor area configured to receive at least a portion of a sensor, wherein the plate body comprises a substantially flat plate portion that includes a substantially planar surface that faces an upstream or a downstream direction;
forming the integrally formed sensor area as a pocket or recessed area within the substantially planar surface to face the upstream or the downstream direction;
forming the mixer baffle with an outer peripheral edge that extends about the substantially flat plate portion and forms a rim or lip that fits against an inner surface of a mixer outer shell, and wherein the pocket or recessed area extends away from the outer peripheral edge of the substantially flat plate portion toward a mixer central axis; and
mounting the mixer baffle to the mixer outer shell having an upstream end configured to be connected to an upstream exhaust component and a downstream end configured to be connected to a downstream component, the mixer outer shell providing an internal cavity that surrounds the mixer central axis.

21. The method according to claim 20, wherein the mixer baffle comprises an inlet baffle, and including providing the mixer outer shell with a doser opening and at least one sensor opening, mounting the inlet baffle at the upstream end of the mixer outer shell such that the plate body faces the upstream direction, forming the integrally formed sensor area to have a length that is greater than a width, aligning a doser mount configured to receive a doser with the doser opening, and aligning the at least one sensor opening with the integrally formed sensor area.

22. The method according to claim 20, wherein the pocket or recessed area comprises a base surface that extends away from the substantially planar surface in a direction along the mixer central axis and includes opposing side walls extending from the base surface to the substantially planar surface of the plate body.

* * * * *